United States Patent
Strock et al.

(10) Patent No.: US 9,528,008 B2
(45) Date of Patent: Dec. 27, 2016

(54) LIGHTWEIGHT AND CORROSION RESISTANT ABRADABLE COATING

(71) Applicant: UNITED TECHNOLOGIES CORPORATION, Hartford, CT (US)

(72) Inventors: Christopher W. Strock, Kennebunk, ME (US); Michael J. Maloney, Marlborough, CT (US)

(73) Assignee: United Technologies Corporation, Farmington, CT (US)

(*) Notice: Subject to any disclaimer, the term of this patent is extended or adjusted under 35 U.S.C. 154(b) by 0 days.

(21) Appl. No.: 14/771,893

(22) PCT Filed: Dec. 30, 2013

(86) PCT No.: PCT/US2013/078180
§ 371 (c)(1),
(2) Date: Sep. 1, 2015

(87) PCT Pub. No.: WO2014/137463
PCT Pub. Date: Sep. 12, 2014

(65) Prior Publication Data
US 2016/0017154 A1 Jan. 21, 2016

Related U.S. Application Data

(60) Provisional application No. 61/774,047, filed on Mar. 7, 2013.

(51) Int. Cl.
| | |
|---|---|
| *C23C 30/00* | (2006.01) |
| *C09D 5/08* | (2006.01) |
| *C23C 4/04* | (2006.01) |
| *C08K 3/08* | (2006.01) |
| *C08K 3/38* | (2006.01) |

(52) U.S. Cl.
CPC . *C09D 5/08* (2013.01); *C08K 3/08* (2013.01); *C08K 3/38* (2013.01); *C23C 4/04* (2013.01); *C23C 30/00* (2013.01); *C08K 2003/0812* (2013.01); *C08K 2003/0862* (2013.01); *C08K 2003/0881* (2013.01); *C08K 2003/385* (2013.01)

(58) Field of Classification Search
CPC .............. C08K 3/08; C08K 3/38; C09D 5/08; C23C 30/00; C23C 4/04
See application file for complete search history.

(56) References Cited

U.S. PATENT DOCUMENTS

| | | | |
|---|---|---|---|
| 4,566,700 A | 1/1986 | Shiembob | |
| 5,299,353 A * | 4/1994 | Nazmy | C22C 14/00 29/889.1 |
| 5,434,210 A | 7/1995 | Rangaswamy et al. | |
| 5,536,022 A | 7/1996 | Sileo et al. | |
| 5,780,116 A | 7/1998 | Sileo et al. | |
| 5,873,703 A | 2/1999 | Kelly et al. | |
| 5,955,151 A | 9/1999 | Hajmrle et al. | |
| 6,089,825 A | 7/2000 | Walden et al. | |
| 7,553,563 B2 * | 6/2009 | Grau | F16D 69/027 419/10 |
| 2006/0032558 A1 * | 2/2006 | Holloway | C22C 1/0491 148/437 |
| 2006/0078749 A1 | 4/2006 | Grau et al. | |
| 2010/0024616 A1 | 2/2010 | Wobben | |
| 2012/0099973 A1 | 4/2012 | Strock | |
| 2013/0167965 A1 * | 7/2013 | Cheney | F16L 9/14 138/146 |

FOREIGN PATENT DOCUMENTS

| | | | |
|---|---|---|---|
| CN | 102134714 A * | 7/2011 | |
| EP | 0361709 | 4/1990 | |

OTHER PUBLICATIONS

V. E. Oliker et al., Tribological Properties of Detonation Coatings Based on Titanium Aluminides and Aluminum Titanate, Powder Metallurgy and Metal Ceramics, Kluwer Academic Publishers-Consultants Bureau, NE, vol. 44, No. 11-12, Nov. 1, 2005, pp. 531-536, XP019223954, ISSN: 1573-9066, DOI: 10.1007/S11106-006-0021-1.

S. Adachi et al., Improvement of adhesive strength of Ti-Al plasma sprayed coating, Surface & Coatings Technology, Elsevier, Amsterdam, NL, vol. 201, No. 9-11, Jan. 31, 2007, pp. 5617-5620, XP005738731, ISSN: 0257-8972, DOI: 10.1016/j. surfcoat.2006.07.014.

European Search Report for EP Application No. 13876883.3 dated Oct. 10, 2016.

* cited by examiner

*Primary Examiner* — Anthony J Green
(74) *Attorney, Agent, or Firm* — Bachman & LaPointe, P.C.

(57) ABSTRACT

An abradable coating for application to a gas turbine engine part is formed from a titanium aluminide alloy, a filler material, and porosity. The coating may be applied to a part such as a casing made from a titanium alloy.

20 Claims, 1 Drawing Sheet

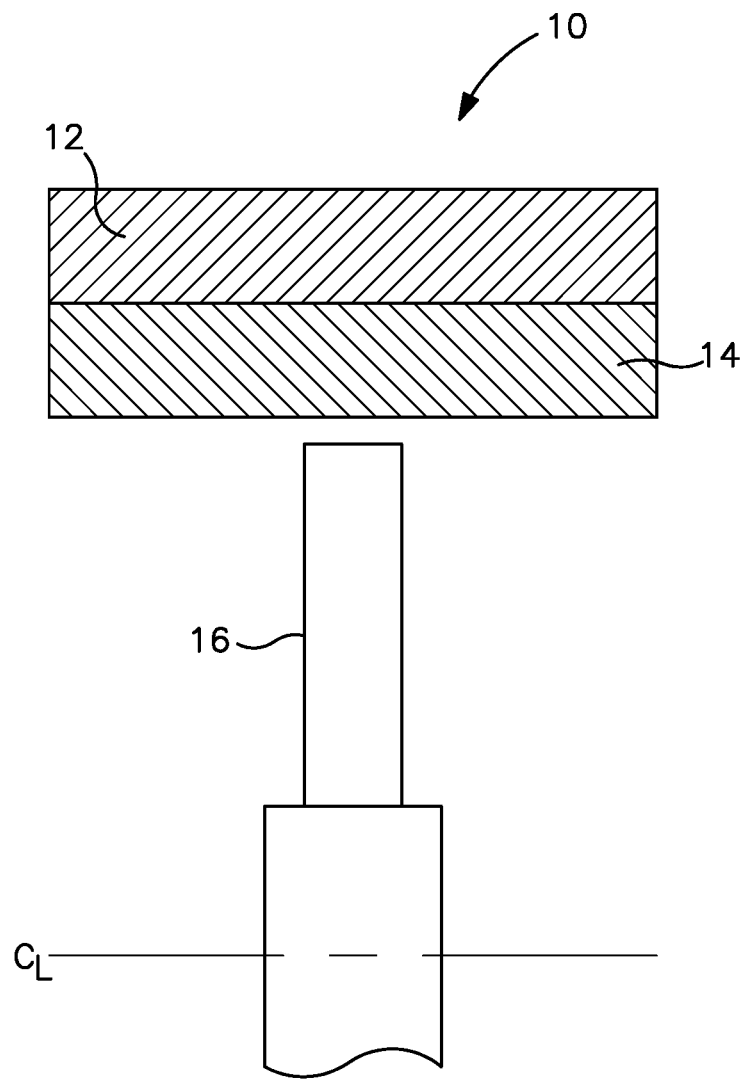

LIGHTWEIGHT AND CORROSION RESISTANT ABRADABLE COATING

BACKGROUND

The present disclosure relates to a lightweight and corrosion resistant abradable TiAl coating which can be applied to a gas turbine engine component.

Abradable coatings are applied to fan cases of gas turbine engines to improve engine efficiency by decreasing the gap between the tips of a fan blade and the fan case.

Certain abradable coatings have shown spallation. Corrosion internal to the coating can be significant and is suspected as playing a significant role in weakening the coating and making it susceptible to fatigue cracking and spallation. In addition to weakening by corrosion, the aluminum alloy forming the abradable coating has low ductility and may be a poor coefficient of thermal expansion match to the substrate forming the fan case, typically a titanium alloy. The low ductility of an 88/12 Al/Si alloy and mechanical and thermally induced strains may result in cracking of the coating and subsequent loss of coating chunks.

SUMMARY

In accordance with the present disclosure, there is provided an abradable coating which broadly comprises a titanium aluminide alloy, a filler material, and porosity.

In another and alternative embodiment, the titanium aluminide alloy comprises from 35 to 55 at % titanium, from 45 to 65 at % aluminum, up to 3.0 at % chromium, and up to 5.0 at % nickel.

In another and alternative embodiment, the titanium aluminide alloy comprises from 35 to 55 at % titanium, from 45 to 65 at % aluminum, from 1.0 to 3.0 at % chromium, and from 1.0 to 5.0 at % nickel.

In another and alternative embodiment, the titanium aluminide alloy is present in an amount from 25 to 45 vol %.

In another and alternative embodiment, the porosity is up to 25% by volume.

In another and alternative embodiment, the porosity is less than 10% by volume.

In another and alternative embodiment, the filler and the porosity are present in an amount of at least 33 vol %.

In another and alternative embodiment, the filler and the porosity are present in an amount in the range of from 50 to 75 vol %.

In another and alternative embodiment, the filler and the porosity are present in an amount in the range of from 60 to 70 vol %.

In another and alternative embodiment, the filler is a soft or friable filler material.

In another and alternative embodiment, the filler is hexagonal boron nitride.

Further, in accordance with the present disclosure, there is provided a turbine engine component which broadly comprises a substrate; an abradable coating applied to the substrate; and the abradable coating comprising a titanium aluminide alloy, a filler material, and porosity.

In another and alternative embodiment, the titanium aluminide alloy comprises from 35 to 55 at % titanium, from 45 to 65 at % aluminum, up to 3.0 at % chromium, and up to 5.0 at % nickel.

In another and alternative embodiment, the titanium aluminide alloy comprises from 35 to 55 at % titanium, from 45 to 65 at % aluminum, from 1.0 to 3.0 at % chromium, and from 1.0 to 5.0 at % nickel.

In another and alternative embodiment, the titanium aluminide alloy is present in an amount from 25 to 45 vol %.

In another and alternative embodiment, the porosity is up to 25% by volume.

In another and alternative embodiment, the porosity is less than 25% by volume.

In another and alternative embodiment, the filler and the porosity are present in an amount of at least 33 vol %.

In another and alternative embodiment, the filler and the porosity are present in an amount in the range of from 50 to 75 vol %.

In another and alternative embodiment, the filler and the porosity are present in an amount in the range of from 60 to 70 vol %.

In another and alternative embodiment, the filler is a soft or friable filler material.

In another and alternative embodiment, the filler is hexagonal boron nitride.

In another and alternative embodiment, the substrate is formed from a titanium alloy.

In another and alternative embodiment, the turbine engine component comprises a casing.

Other details of the lightweight and corrosion resistant abradable coating are set forth in the following detailed description.

BRIEF DESCRIPTION OF THE DRAWING(S)

The FIGURE shows a turbine engine component having an abradable coating applied to a substrate.

DETAILED DESCRIPTION

In accordance with the present disclosure, there is provided a corrosion resistant and low density TiAl abradable coating. TiAl abradable coatings are desirable because they have a better coefficient of thermal expansion match to the titanium substrates. TiAl abradable coatings also provide excellent corrosion resistance, no titanium fire danger, and no risk of dust deflagration. Ambient and low temperature ductility, strain tolerance and abradability can be enhanced by tailoring the thermal spray coating's microstructure. Porosity, filler content, such as hexagonal boron nitride, and splat/defect structure may all be used to reduce modulus and improve strain tolerance for improved resistance to cracking and delamination.

The FIGURE illustrates a turbine engine component 10 having a substrate 12 formed from a titanium alloy and an abradable coating 14 applied to a surface of the substrate. The turbine engine component 10 can be a casing, such as a fan casing, surrounding a rotating structure 16, such as a fan blade, a turbine blade, or a compressor blade.

The abradable coating 14 comprises a titanium aluminide alloy, a filler material, and porosity. The titanium aluminide alloy may comprise from 35 to 55 at % titanium, from 45 to 65 at % aluminum, up to 3.0 at % chromium, and up to 5.0 at % nickel. In a non-limiting embodiment, the titanium aluminide alloy may comprise from 35 to 55 at % titanium, from 45 to 65 at % aluminum, from 1.0 to 3.0 at % chromium, and from 1.0 to 5.0 at % nickel. One embodiment of the titanium aluminide alloy can be 47 at % titanium, 2.0 at % chromium, 2.0 at % nickel, and the balance aluminum. The titanium aluminide alloy may be present in an amount from 25 to 45 vol %.

The porosity in the coating may be up to 25% by volume. In a non-limiting embodiment, the porosity is present in an amount less than 10% by volume. In a non-limiting embodiment, the porosity may be in the range of from 1.0% to less than 10% by volume. High porosities, on the order of 50 vol %, in porous abradable coatings may cause thermodynamic efficiency losses.

Together, the filler material in the abradable coating 14 and the porosity of the coating 14 may be present in an amount of at least 33 vol %. In a non-limiting embodiment, the filler and the porosity may be present in an amount in the range of from 50 to 75 vol %. In still another non-limiting embodiment, the filler and the porosity may be present in an amount in the range of from 60 to 70 vol %.

The filler in the abradable coating 14 may be a soft or friable filler material. In a non-limiting embodiment, the filler may be hexagonal boron nitride.

The splat/defect structure of the abradable coating 14 can reduce the modulus of elasticity of the coating 14 by creating micro-cracks and sliding contact interfaces within and between deposited particles. These interfaces have friction and move when the coating is strained, thus providing strain compliance and reduced modulus compared to the fully dense material. Bonding between particles is strongly affected by particle size, particle (droplet) temperature (superheat), coating substrate temperature and particle (droplet) velocity. Larger, hotter, faster particles and hotter substrate result in better bonding and higher modulus and lower strain tolerance. The abradable coating 14 may be applied to the substrate 12 using any suitable depositing technique, such as a low velocity plasma spray using agglomerates of the titanium aluminide subparticles and filler material particles such as hexagonal boron nitride particles. The deposition technique may be controlled to form a coating that provides a desired modulus reduction for the coating and improve strain tolerance for improved resistance to cracking and delamination.

There has been provided in accordance with the instant disclosure a lightweight and corrosion resistant abradable coating. While the coating has been described in the context of specific embodiments thereof, other unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. An abradable coating composition for application to a gas turbine engine part, said abradable coating composition comprising a titanium aluminide alloy wherein said titanium aluminide alloy comprises from 35 to 55 at % titanium, from 45 to 65 at % aluminum, from 1.0 to 3.0 at % chromium, and from 1.0 to 5.0 at % nickel, a filler material, and porosity.

2. The abradable coating composition according to claim 1, wherein said titanium aluminide alloy is present in an amount from 25 to 45 vol %.

3. The abradable coating composition according to claim 1, wherein said porosity is from 1% to 25% by volume.

4. The abradable coating composition according to claim 1, wherein said porosity is from 1% to 10% by volume.

5. The abradable coating composition according to claim 1, wherein said filler and said porosity are present in an amount of at least 33 vol %.

6. The abradable coating composition according to claim 1, wherein said filler and said porosity are present in an amount in the range of from 50 to 75 vol %.

7. The abradable coating composition according to claim 1, wherein said filler and said porosity are present in an amount in the range of from 60 to 70 vol %.

8. The abradable coating composition according to claim 1, wherein said filler is a soft or friable filler material.

9. The abradable coating composition according to claim 1, wherein said filler is hexagonal boron nitride.

10. A turbine engine component comprising:
   a substrate;
   an abradable coating applied to said substrate; and
   said abradable coating comprising a titanium aluminide alloy wherein said titanium aluminide alloy comprises from 35 to 55 at % titanium, from 45 to 65 at % aluminum, from 1.0 to 3.0 at % chromium, and from 1.0 to 5.0 at % nickel, a filler material, and porosity.

11. The turbine engine component according to claim 10, wherein said titanium aluminide alloy is present in an amount from 25 to 45 vol %.

12. The turbine engine component according to claim 10, wherein said porosity is up to 25% by volume.

13. The turbine engine component according to claim 10, wherein said porosity is less than 10% by volume.

14. The turbine engine component according to claim 10, wherein said filler and said porosity are present in an amount of at least 33 vol %.

15. The turbine engine component according to claim 10, wherein said filler and said porosity are present in an amount in the range of from 50 to 75 vol %.

16. The turbine engine component according to claim 10, wherein said filler and said porosity are present in an amount in the range of from 60 to 70 vol %.

17. The turbine engine component according to claim 10, wherein said filler is a soft or friable filler material.

18. The turbine engine component according to claim 10, wherein said filler is hexagonal boron nitride.

19. The turbine engine component according to claim 10, wherein said substrate is formed from a titanium alloy.

20. The turbine engine component according to claim 10, wherein said turbine engine component comprises a casing.

* * * * *